United States Patent [19]
Lilly

[11] 3,793,168
[45] Feb. 19, 1974

[54] METHOD OF RECOVERING SILVER

[76] Inventor: Robert B. Lilly, 6106 Oakclair Dr., Austin, Tex. 78746

[22] Filed: Jan. 18, 1971

[21] Appl. No.: 107,133

[52] U.S. Cl.................. 204/109, 75/118, 96/60 BF
[51] Int. Cl. ........................ C22d 1/12, C22b 11/04
[58] Field of Search ...... 204/109; 75/118; 96/60 BF

[56] References Cited
UNITED STATES PATENTS
3,510,413   5/1970   Lindau................................ 204/109

FOREIGN PATENTS OR APPLICATIONS
1,051,117   2/1959   Germany........................... 96/60 BF

*Primary Examiner*—John H. Mack
*Assistant Examiner*—Richard L. Andrews
*Attorney, Agent, or Firm*—Kenneth R. Glaser; John F. Booth

[57] ABSTRACT

A method of recovering metallic silver from scrap photographic film in which the film is first immersed in a solution of hydrochloric or hydrobromic acid and a chromate; thereafter immersed in a hypo bath; the free silver thereafter being removed from the hypo bath by an electrolytic process.

15 Claims, 1 Drawing Figure

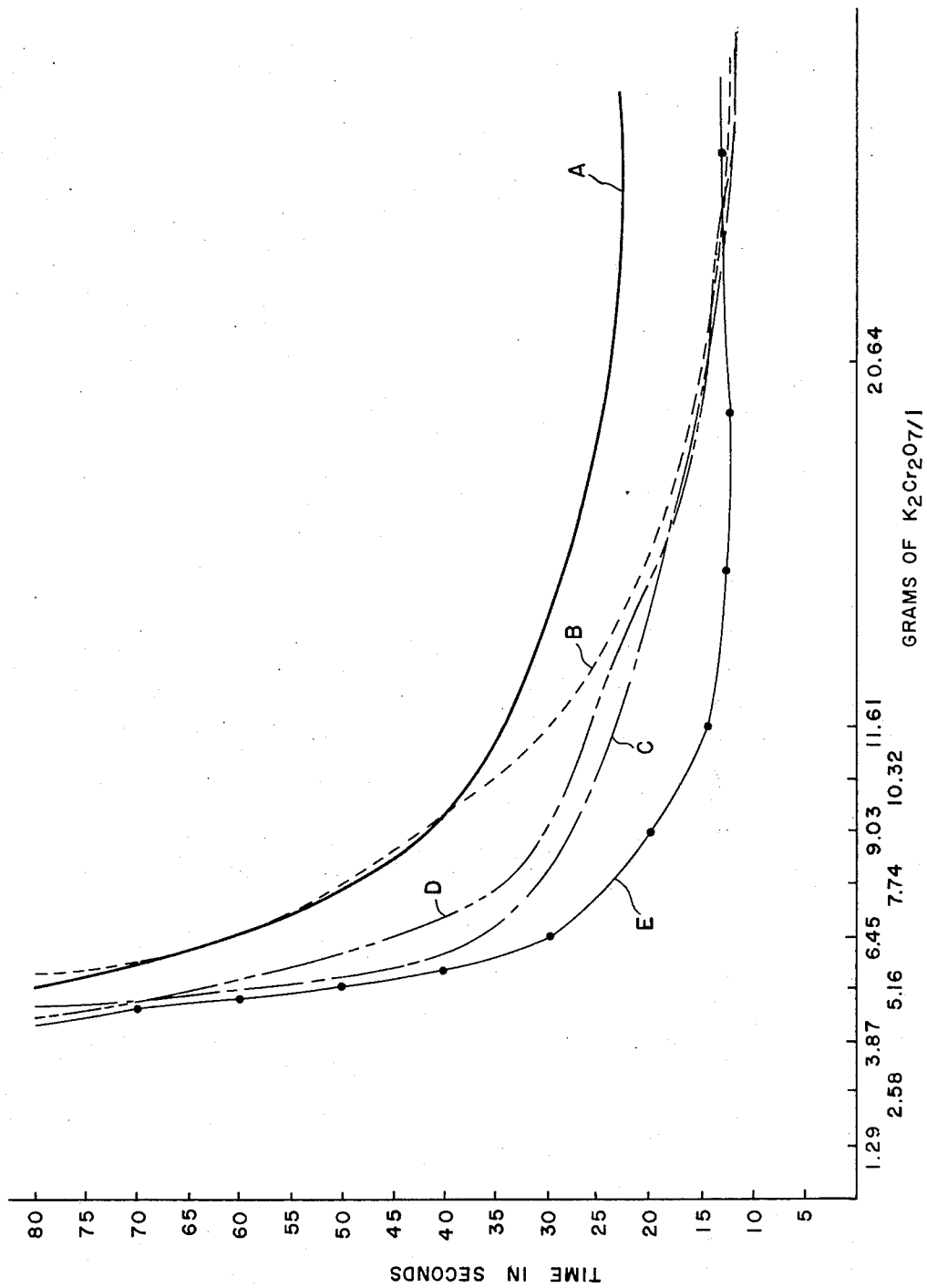

METHOD OF RECOVERING SILVER

BACKGROUND OF THE PRESENT INVENTION

The present invention relates to the recovery of silver from photographic film and more particularly to a new and improved method for removing silver from film.

DESCRIPTION OF THE PRIOR ART

The image on conventional photographic film is formed by metallic silver which is held on the surface of a base material by a gel-like material. Because silver is a valuable material and scrap or used photographic film such as that used for patient X-rays in hospitals, lithographic printing and the like contains large amounts of silver, it becomes desirable to recover this silver.

It has been a practice to employ various methods to recover silver from the film and in one process the film is burned and the residue is refined to recover the silver. Although this process has been successful at recovering silver, it has the disadvantage of oxydizing and wasting a portion of the silver.

Another method utilized is to immerse the scrap film in a bath which will convert the silver into a soluble silver salt such as silver sulfate and then remove the silver sulfate from the bath. One bath which has been used is a mixture of permanganate and sulfuric acid, but this method has not been completely successful because the reaction of the silver and the bath is immediate, thus contaminating and reducing the strength of the bath. This requires that the bath be changed frequently, thereby increasing the cost of the process.

SUMMARY OF THE INVENTION

The purpose of this invention is to provide a process for recovering silver from used or scrap film without wasting the silver or requiring large volumes of treating liquids. To attain this, the present invention contemplates a process wherein the film is pre-immersed in a reversing solution to facilitate the removal of the silver from a subsequent solution into which the so-treated film is subsequently immersed. The reversing solution is advantageously composed of a halogenic acid, particularly hydrochloric or hydrobromic, and a chromate catalyst.

OBJECTS OF THE INVENTION

An object of the present invention is the provision of a process for recovering silver from waste or scrap film.

Another object is to provide a process for recovering silver without substantial waste of treating fluids.

A further object of the invention is the provision of a process for recovering silver from waste or scrap film which is efficient and inexpensive to utilize.

Other objects and many of the attendant advantages of this invention will be readily appreciated by those of ordinary skill in the art as the same becomes better understood by reference to the following detailed description, when considered in connection with the accompanying drawings in which the sole FIGURE of the drawing is a graph of the reaction time of the reversing solution and the film for varying concentrations of acid and amounts of potassium dichromate.

DESCRIPTION OF THE INVENTION

In carrying out the present invention, scrap photographic film is preferably placed in a basket or container as it is subjected to the subsequently described process steps. While these containers may be formed of various type materials, it has been found desirable to utilize non-metallic materials in their construction, such as plastic or fiberglass, to avoid any undesirable reaction throughout the operation. Scrap photographic film primarily means film which has been partially or entirely exposed and/or developed, but may also include some film which is unexposed. Thus, while the primary advantage of the process of the invention occurs with respect to exposed or developed film, batch processing of all types of discarded film, including unexposed but damaged film, avoids the necessity of separating out the unexposed film.

In accordance with a preferred embodiment of the present invention, the scrap photographic film is treated as follows:

First, the film is immersed in a reversing solution which is effective to convert the silver on the film to a form which facilitates its recovery pursuant to subsequent process steps. Specifically, the reversing solution is believed to convert the metallic silver of the film to a silver halide which is highly soluble in solvent solutions into which the film is subsequently immersed. After immersion of the film in the reversing solution for the prescribed period of time, the film may be drained, rinsed in water, and then drained again.

Second, the film is then immersed in a solvent solution, such as a conventional hypo bath of sodium thiosulfate, or alternatively ammonium thiosulfate, or ammonium hydroxide. As a consequence of this step, the silver is contained in the solution in a form suitable for subsequent recovery. In accordance with the practice of the present invention, the understanding of the exact chemical process is not necessary, but it is believed that the silver halide which is now present on the film is dissolved by, and becomes a part of, the solvent solution. Immersion of the film within a hypo bath, for example, for a period of approximately two to three minutes has been found sufficient. The film may then be removed and discarded.

Third, removal of the metallic silver from the hypo bath may now be effected by conventional techniques, for example by electrolysis, the silver plating out on the cathode of the electroplating apparatus. There are many types of standard electroplating apparatus that may be utilized for this recovery, one such example being units manufactured and sold by W. B. Snook Manufacturing, Inc. of Palo Alto, Calif. The recovered silver may then be removed from the cathodes, and if desired, subjected to a refining operation to increase its purity.

In accordance with a specific feature of the invention of the process, the reversing solution consists of hydrochloric or hydrobromic acid and a chromate, such as sodium chromate, sodium bichromate, potassium bichromate, or potassium dichromate. Referring to the sole FIGURE in the drawing, there is illustrated a plot of the various typical reaction times of reversing solutions containing varying amounts of constituents. For example, plot A shows the reaction time in seconds versus varying amounts of potassium dichromate for a solution containing 5 c.c. concentrated HCl/liter (approx. 0.1 Normal); plot B for a solution containing 60 c.c. concentrated HCl/liter (approx. 0.720 Normal); plot C for a solution containing 120 c.c. HCl/liter (1.44 Normal); plot D for a solution containing 180 c.c. HCl/liter (approx. 2.16 Normal); and plot E for 120 c.c. HBr/liter (approx. 2.0 Normal).

It can thus be seen that by carefully choosing the concentration of the hydrochloric or hydrobromic acid and the amount of the particular chromate, a complete reaction may be effected after as short a time as approximately 15 seconds. It has also been found that agitation of the reversing solution will speed up the reaction of the solution with the scrap film.

As a consequence of the above process, substantial increases in recovery of silver from scrap film, particularly exposed and developed film, has been observed. This is believed due to the reconversion of the silver of the exposed or developed film to a silver halide, which is then removed from the film during the immersion in the hypo solution. As one example of the results obtained from this process, approximately 12 pounds of silver was recovered from 1,260 pounds of scrap lithographic film.

It should be understood, of course, that the foregoing disclosure relates to only a preferred method of practicing the invention and numerous modifications or alterations may be made therein without departing from the spirit and the scope of the invention as set forth in the appended claims.

What is claimed and desired to be secured by Letters Patent of the United States is:

1. A process for recovering silver from scrap film which comprises:
    immersing the film in a solution of potassium dichromate and an acid selected from the group consisting of hydrochloric acid and hydrobromic acid to convert the silver of said film to a silver halide;
    immersing the film in a solvent selected from the group consisting of sodium thiosulfate, ammonium thiosulfate and ammonium hydroxide to dissolve said silver halide; and
    removing the silver from said solvent.

2. A process as defined in claim 1 wherein said silver is removed from said solvent by electroplating.

3. A process as defined in claim 1 comprising the additional steps of draining the film after immersion in said solution.

4. A process as defined in claim 1 wherein said solution is agitated during immersion of film.

5. A process as defined in claim 1 comprising the additional step of washing the film prior to its immersion in said solvent and after immersion in said solution.

6. A process as defined in claim 5 comprising the additional steps of draining the film after immersion in said solution and after washing.

7. A process for recovering silver from scrap film which comprises:
    immersing the film in a solution of potassium dichromate and an acid selected from the group consisting of hydrochloric acid and hydrobromic acid to convert the silver of said film to a silver halide;
    immersing the film in a solvent selected from the group consisting of sodium thiosulfate, ammonium thiosulfate and ammonium hydroxide to dissolve said silver halide; and
    removing the silver from said solvent.

8. A process as defined in claim 7 wherein said silver is removed from said solvent by electroplating.

9. A process as defined in claim 1 comprising the additional steps of draining the film after immersion in said solution.

10. A process as defined in claim 7 wherein said solution is agitated during immersion of film.

11. A process as defined in claim 1 comprising the additional step of washing the film prior to its immersion in said solvent and after immersion in said solution.

12. A process as defined in claim 11 comprising the additional steps of draining the film after immersion in said solution and after washing.

13. A process for recovering silver from scrap film which comprises:
    immersing the film for at least 15 seconds in a solution of 20.64 grams of potassium dichromate per liter of 1.44 normal hydrochloric acid to convert the silver of said film to a silver halide;
    agitating said solution while the film is immersed therein;
    draining the film;
    immersing the film in water;
    draining the film;
    immersing the film in sodium thiosulfate for approximately 2 to 3 minutes to dissolve said silver halide; and
    removing silver from said sodium thiosulfate by electroplating.

14. A process for recovering silver from exposed film, comprising:
    a. immersing the film into a first solution of potassium dichromate and an acid selected from the group consisting of hydrochloric acid and hydrobromic acid to cause the silver on said film to be converted to a silver halide,
    b. thereafter immersing the film into a second hypo solution which results in the removal of said silver halide into said second solution, and
    c. removing the silver from said second solution.

15. The process as described in claim 14 wherein said removal of the silver is by an electroplating process.

* * * * *